US007753995B2

(12) United States Patent
Okano et al.

(10) Patent No.: US 7,753,995 B2
(45) Date of Patent: Jul. 13, 2010

(54) GAS CONCENTRATOR

(75) Inventors: Hiroshi Okano, Koga (JP); Ken-ichiro Yamada, Koga (JP)

(73) Assignee: Seibu Giken Co., Ltd., Fukuoka (JP)

( * ) Notice: Subject to any disclaimer, the term of this patent is extended or adjusted under 35 U.S.C. 154(b) by 250 days.

(21) Appl. No.: 12/000,339

(22) Filed: Dec. 11, 2007

(65) Prior Publication Data
US 2009/0145301 A1 Jun. 11, 2009

(51) Int. Cl.
*B01D 53/06* (2006.01)
(52) U.S. Cl. .......................... 96/125; 277/918
(58) Field of Classification Search ............... 96/125, 96/143, 144, 150; 95/107, 113; 55/502; 165/8, 9; 277/412, 918
See application file for complete search history.

(56) References Cited

U.S. PATENT DOCUMENTS

| 3,800,859 | A | * | 4/1974 | Norback | 96/125 |
| 3,907,310 | A | * | 9/1975 | Dufour | 165/9 |
| 4,897,221 | A | | 1/1990 | Manchak, Jr. | |
| 5,162,636 | A | | 11/1992 | Randolph et al. | |
| 5,572,799 | A | * | 11/1996 | Masuyuki et al. | 34/80 |
| 5,733,451 | A | * | 3/1998 | Coellner et al. | 210/496 |
| 5,989,702 | A | | 11/1999 | Draper et al. | |
| 6,004,384 | A | * | 12/1999 | Caudle | 96/125 |
| 6,165,254 | A | * | 12/2000 | Kawakami et al. | 96/125 |
| 6,328,787 | B1 | | 12/2001 | Yamauchi | |
| 6,527,837 | B2 | * | 3/2003 | Kurosawa et al. | 96/125 |
| 7,207,123 | B2 | * | 4/2007 | Tanahashi et al. | 34/80 |
| 2004/0020359 | A1 | | 2/2004 | Koermer et al. | |
| 2005/0235827 | A1 | | 10/2005 | Dinnage et al. | |
| 2006/0042464 | A1 | * | 3/2006 | Fujioka | 95/113 |

FOREIGN PATENT DOCUMENTS

| JP | 2001-276551 | | 10/2001 |
| JP | 2002-243158 | | 9/2002 |
| JP | 2002-273158 | * | 9/2002 |
| JP | 2004-130189 | | 4/2004 |

OTHER PUBLICATIONS

U.S. Office Action for related U.S. Appl. No. 11/086,561; mailed Sep. 20, 2007.
U.S. Office Action for related U.S. Appl. No. 11/086,561; mailed Jan. 10, 2008.
U.S. Office Action for related U.S. Appl. No. 11/086,561; mailed Aug. 13, 2008.
U.S. Office Action for related U.S. Appl. No. 11/086,561; mailed Dec. 1, 2008.
U.S. Office Action for related U.S. Appl. No. 11/086,561; mailed Aug. 31, 2009.
U.S. Notice of Allowance for related U.S. Appl. No. 11/086,561; mailed Jan. 15, 2010.

* cited by examiner

*Primary Examiner*—Frank M Lawrence
(74) *Attorney, Agent, or Firm*—Staas & Halsey LLP

(57) ABSTRACT

A revolving gas adsorption concentrator uses about 300 degree centigrade of hot desorption air. The revolving gas adsorption concentrator prevents leakage of such hot desorption air. An elastic seal which has elasticity divides a honeycomb shape rotor into a desorption zone and an adsorption zone and touches the honeycomb shape rotor. A heat-resistant seal comprises of material whose heat resistance is higher than elastic seal. The heat-resistant seal has two plates which has a mutually opened spacing to prevent hot gas from going to the elastic seal based on the labyrinth effectiveness. The elastic seal is formed in the outside of desorption zone from heat-resistant seal. The seal of the hot desorption air is almost blocked by heat-resistant seal and the desorption air which leaked slightly can be thoroughly blocked completely by elastic seal.

10 Claims, 4 Drawing Sheets

GAS CONCENTRATOR

BACKGROUND OF THE INVENTION

The revolving gas adsorption concentrator is used for the concentration of VOC. The VOC, which is a paint or ink solvent, is emitted into the air from a painting factory or a printing factory. In order to burn and to detoxicate these VOC(s), it is necessary to condense the VOC until the VOC reaches to the concentration level of self-burning. For this reason, the revolving gas adsorption concentrator using the honeycomb shape rotor which supported adsorbent is spread quickly. The honeycomb shape rotor is divided into the adsorption zone and the desorption zone at least. The processed air containing VOC is passed to the adsorption zone and air passes through the honeycomb shape rotor to be adsorbed in the hot desorption zone. As a result, the VOC is desorbed. Development of what can deal with such a revolving gas adsorption concentrator also by many VOC(s) containing the high boiling point matter is demanded.

In U.S. Patent Publication No. 2006/0042464 A1, a technology as such is disclosed.

In U.S. Patent Publication NO. 2006/0042464 A1, a seal including nonflammable materials, such as mica, that has a slot in the contact surface with a honeycomb shape rotor at the seal surface. As a result, the desorption air whose temperature is 300 degree centigrade could be passed to the desorption zone, and disposal of VOC of a high boiling point is attained.

However, the requirement of VOC removal gradually becomes severe and requires installation of VOC processing equipment in many industries. For this reason, the VOC processing equipments which can be produced easily and cheaply as required. The device disclosed in U.S. Patent Publication NO. 2006/0042464 A1 has a seal, using mica, to prevent the leakage of hot desorption air. However, this seal is expensive.

SUMMARY OF THE INVENTION

The device disclosed herein can use about 300 degree centigrade hot desorption air using general and cheap materials, such as stainless steel. A revolving gas adsorption concentrator can prevent the leakage of such a hot desorption air.

One potential object is to resolve the above subjects. The inventors propose a device having the honeycomb shape rotor which rotates and supports adsorbent. A heat-resistant seal uses a material of higher temperature resistant than an elastic seal which contacts a surface of the rotor. A heat-resistant seal comprises of two or more tabular members with mutually opened spacing to prevent hot gas going to an elastic seal based on the labyrinth effectiveness, and hot gas is kept from going by the labyrinth effectiveness of a heat-resistant seal to an elastic seal.

Even if the high boiling point material adheres to a honeycomb shape rotor, hot desorption air can desorb. And when desorption air leaks from a heat-resistant seal, the leakage can be thoroughly stopped with an elastic seal. And since hot desorption air does not directly touch the elastic seal, the elastic seal does not deteriorate with the heat of desorption air.

The honeycomb shape rotor which rotates and supports adsorbent comprises of an elastic seal and a heat-resistant seal that are installed as a seal which divides the honeycomb shape rotor into a desorption zone and an adsorption zone, respectively. An elastic seal has elasticity and touches the honeycomb shape rotor. The heat-resistant seal is adjacent to a honeycomb shape rotor. The heat-resistant seal comprises of a material whose heatproof temperature is higher than an elastic seal. The heat-resistant seal includes two or more tabular members with mutually opened spacing to prevent hot gas from going to the elastic seal based on the labyrinth effectiveness. The elastic seal is on the outside of the desorption zone from the heat-resistant seal. The seal of the hot desorption air is almost blocked by a heat-resistant seal, and the desorption air which leaked slightly from the heat resistant seal is stopped completely by an elastic seal.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENTS

Figure 1:
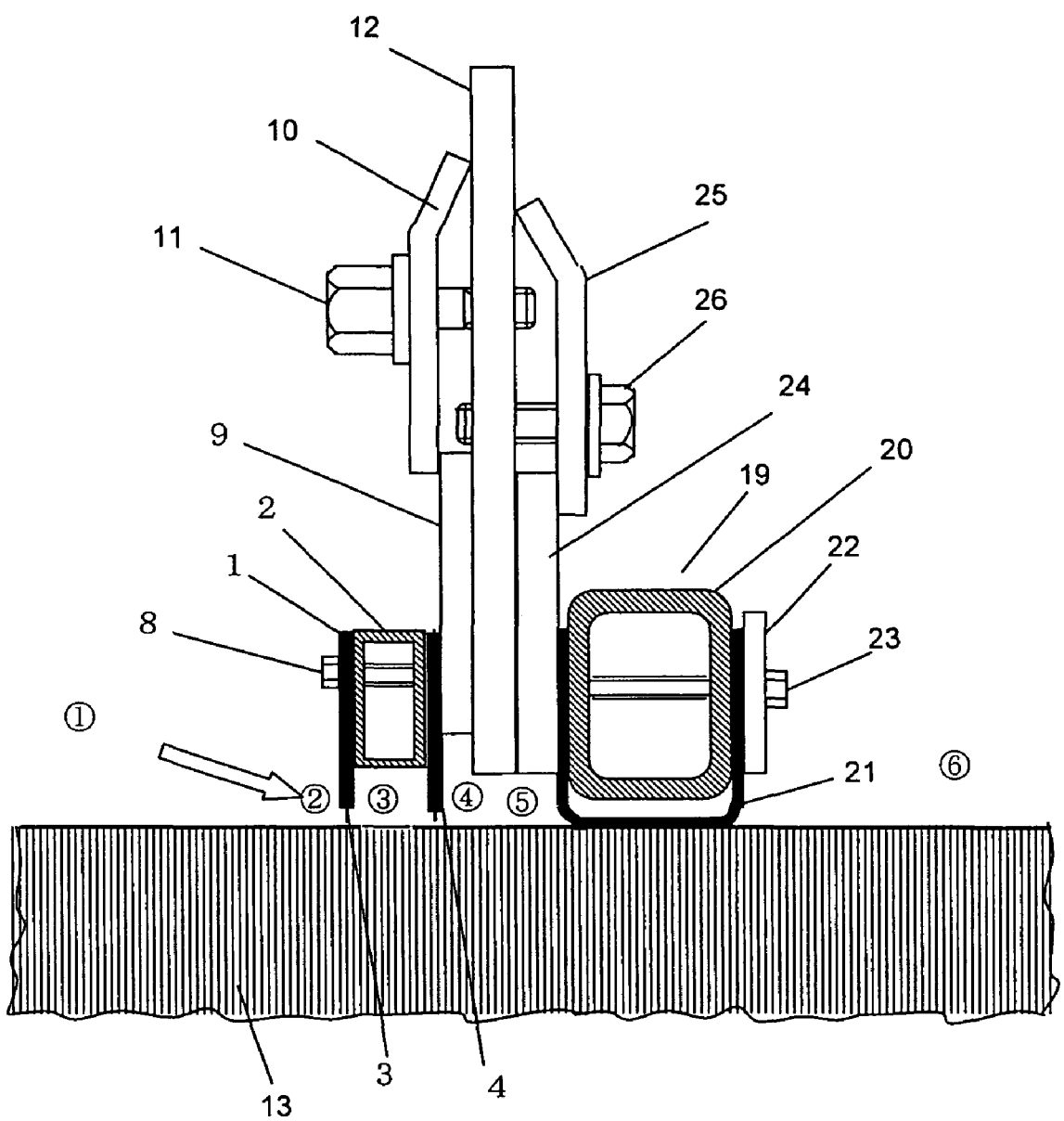
FIG. 1 is a sectional view showing the one potential embodiment of the proposed revolving gas adsorption concentrator.
Figure 2:
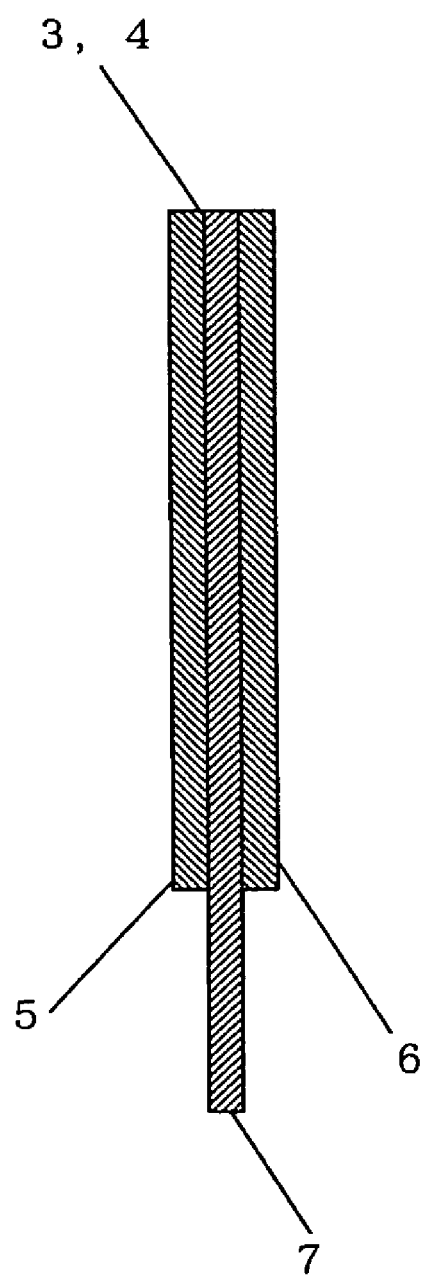
FIG. 2 is a sectional view showing an example of the seal used for this concentrator.

Reference will now be made in detail to the preferred embodiments of the present invention, examples of which are illustrated in the accompanying drawings, wherein like reference numerals refer to like elements throughout.

The embodiment of the revolving gas adsorption concentrator is described in detail along drawings as below. FIG. 1 is a sectional view showing the seal and its installation part of a revolving gas adsorption concentrator.

Heat-resistant seal 1 comprises spacer 2 and seal plates 3 and 4 attached to the both sides of spacer 2. The seal plates 3 and 4 comprises of heat resisting materials, such as stainless steel. Each seal plates 3 and 4 have sandwiched web material 7 which has heat resistance with a heatproof temperature, such as a fluororesin, of not less than about 350 degree centigrade and elasticity between a pair of stainless plates 5 and 6, as shown in drawing 2. Web material 7 is protruded from the lower end of stainless plates 5 and 6 downward. The fluororesin may be a seat of fluororesin and the fluororesin sheet containing glass cross may be sufficient to increase reinforcement.

Heat-resistant seal 1, which comprises of the seal plates 3 and 4 and the spacer 2, is fixed to stay-bolt board 9 with bolt 8. Stay-bolt board 9 is fixed to separator 12 with keep plate 10 and bolt 11.

Figure 3:
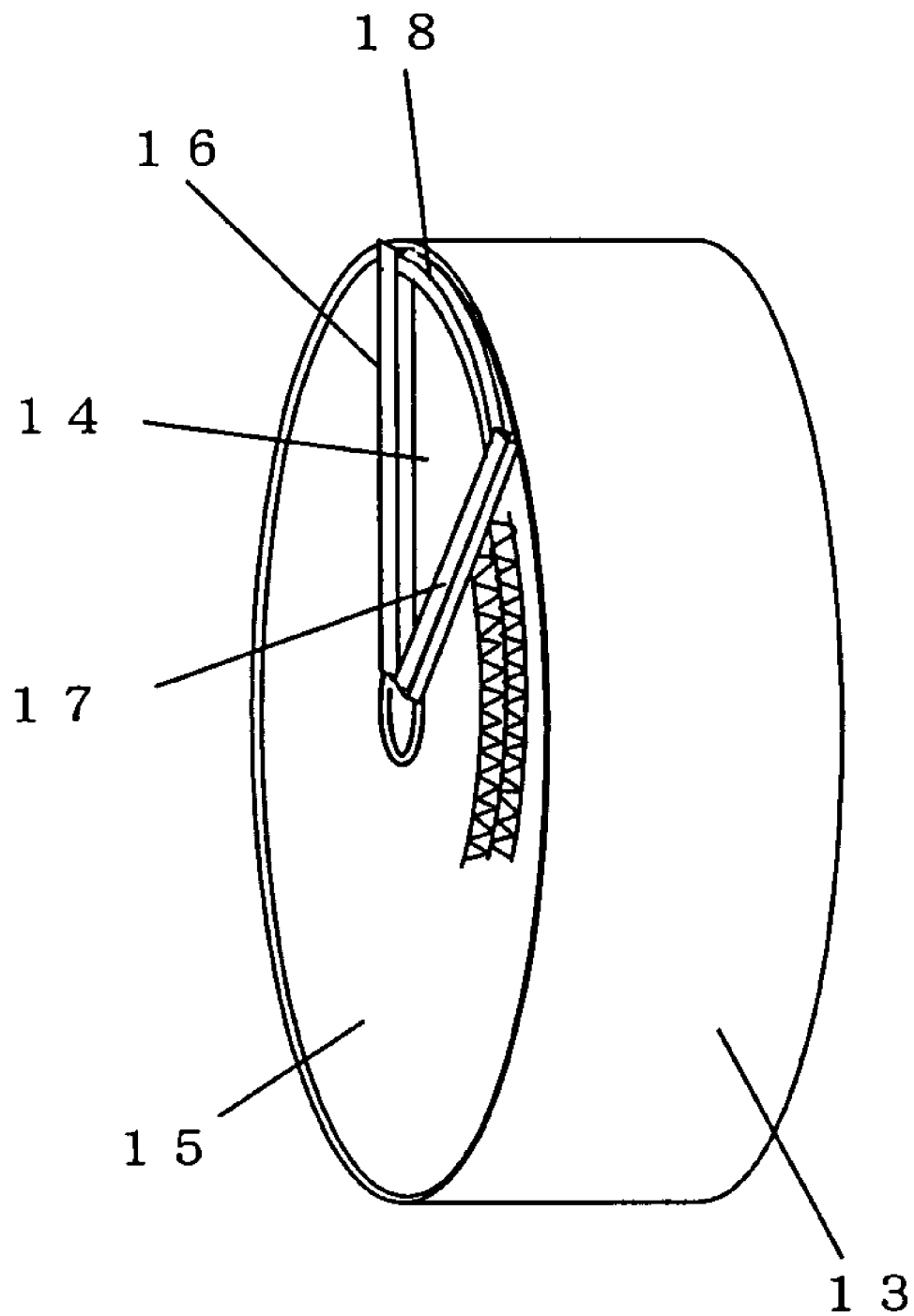
FIG. 3 is a perspective view showing the embodiment of the revolving gas adsorption concentrator.

Separator 12 divides adsorption zone 14 and desorption zone 15 of honeycomb shape rotor 13, as shown in FIG. 3. Desorption zone 15 is surrounded by direct separators 16 and 17 that makes the shape of a pair of V character and arc separator 18. Honeycomb shape rotor 13 is formed by inorganic paper in honeycomb shape to support adsorbent, such as hydrophobic zeolite. Honeycomb shape rotor 13 rotates by a geared motor (not shown), which is connected to a commercial speed control device.

A direction when performing the desorption action at the hot desorption air temperature of about 300 degree centigrade as compared with the time of performing the adsorption concentrating action of VOC at the desorption air temperature of about 180 degree centigrade makes low the motor speed of honeycomb shape rotor 13.

An elastic seal 19 is configured with an elastic plate 21 which is attached to the underside of rectangle pipe 20. Elastic board 21 comprises of an elastic material with a heatproof temperature of about 220 degree centigrade of fluororubber, silicon rubber, etc. with comparatively high heat resistance and high abrasion resistance. The elastic plate 21 contacts the end face of honeycomb shape rotor 13 elastically. The elastic seal 19 can be made from fluororesin reinforced glass fibers.

Rectangle pipe 20 and elastic plate 21 are attached to stay-bolt plate 24 with stationary plate 22 and bolt 23. Stay-bolt plate 24 is attached to separator 12 with keep plate 25 and bolt 26.

The relation of heat-resistant seal 1 and elastic seal 19 which are shown in FIG. 1 is shown below. Heat-resistant seal 1 becomes inside desorption zone 15, and it is made for hot gas to go into the arrow direction of FIG. 1. It may be made for the lower end of web material 7 to touch the end face of honeycomb shape rotor 3 in the above configuration. In this case, the material for web material 7, a high-heat resistant material is better than the high-abrasion material. Because, it is satisfactory even if it somewhat wears out the lower end of web material 7.

Such a revolving gas adsorption concentrator sends processed air to adsorption zone 14 of honeycomb shape rotor 13, rotating honeycomb shape rotor 3. The adsorbent of honeycomb shape rotor 13 adsorbs VOC, contained in processed air. And about 180 degree centigrade desorption air is sent to desorption zone 15, and the VOC by which adsorbent was adsorbed is desorbed. If the amount of this desorption air is made into 1/10 of the amounts of processed air, the VOC concentration will be condensed by the desorption air 10 times the concentration level of processed air. For this reason, it becomes easy to detoxicate desorption air based on a burning or a catalyst.

When high boiling point of VOC is contained in the processed air with the desorption air which is about 180 degree centigrade, the VOC is not fully desorbed and, as a result, VOC is accumulated in honeycomb shape rotor 13. In this case, for example, about 300 degrees centigrade hot air is sent to desorption zone 15, to desorp and re-generate the honeycomb shape rotor 13.

When desorption air passes through desorption zone 15 and seat 7 of seal plates 3 and 4 of heat-resistant seal 1 which is in contact with the end face of honeycomb shape rotor 3, desorption air is blocked by heat-resistant seal 1, and elastic seal 19 is not reached.

When lower end of the seat 7 has an infinitesimal clearance to the end face of a rotor, without touching to the end surface, desorption air passes heat-resistant seal 1 from the clearance. However, in the case of this passage, since the space between seal plates 3 and 4, the labyrinth effectiveness arises and a passage drag becomes large.

Therefore, there is little air which passes the heat resistant seal 1 and temp falls when the air reaches the seal 19. For this reason, the seal works since the elastic since the elastic seal 19 bears the heat and as a result the air which passed the heat-resistant seal 1 will not be leaked outside.

Figure 4:
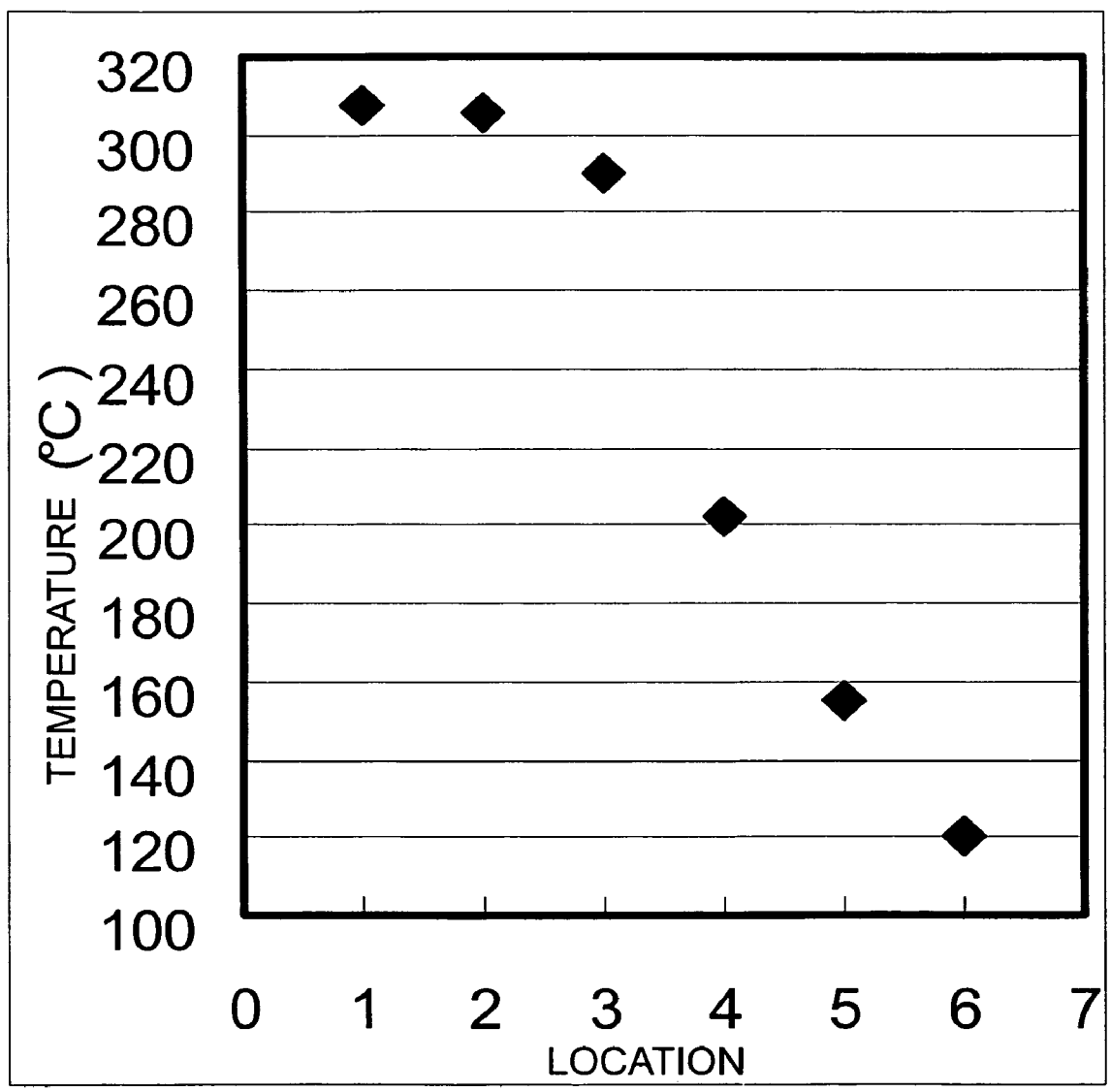
FIG. 4 shows the diagrammatic chart which shows the temperature of each part under desorption action of the revolving gas adsorption concentrator.

The data which measures the temperature of each part under the above mentioned desorption action is shown in FIG. 4. Each temperature in this FIG. 4 expresses the temperature of the location shown by (1)-(6) of FIG. 1. In FIG. 4, it is clear that, even when the temperature of desorption air is over 300 degree centigrade, the temperature at portion (5), i.e. the temperature of elastic seal 19, is 160 degree centigrade or less. For this reason, elastic seal 19 can fully bear heat.

The above example describes the sandwiched web material 7 includes a heat resistance with a heatproof temperature, such as a fluororesin, of not less than about 350 degree centigrade. The elasticity between a pair of stainless plates 5 and 6 is an example of seal plates 3 and 4. It can use seal plates 3 and 4 which replaces stainless plates 5 and 6 and is able to bear the high temperature of a ceramic plate, mica plate, etc.

In the example of the sandwiched web material 7 having the heat resistance with a heatproof temperature of not less than about 350 degree centigrade and elasticity of fluororesin between a pair of stainless plates 5 and 6 is shown as an example of a heat-resistant seal. Silicon resin may replace fluororesin.

In the example where the lower end of seat 7 has the elasticity to the end face of honeycomb shape rotor 13 is shown in a contact position. If a heat-resistant seal 1 is changed into a non-contact condition to the rotor, only stainless plates 5 and 6 can realize without using seat 7. In this case, the number of stainless plates does not need to be one pair.

Even if the embodiment has the VOC containing a high boiling point object, it offers the revolving gas adsorption concentrator in which an adsorption concentrations is possible.

Although a few embodiments have been shown and described, it would be appreciated by those skilled in the art that changes may be made in these embodiments without departing from the principles and spirit of the invention, the scope of which is defined in the claims and their equivalents.

The invention claimed is:

1. A revolving gas adsorption concentrator, comprising:
   a honeycomb shaped rotor that rotates and supports an adsorbent, the honeycomb shape rotor having a seal that divides the honeycomb shape rotor into at least a desorption zone and an adsorption zone,
   wherein the seal comprises an elastic seal and a heat-resistant seal,
   the elastic seal touches a surface of the honeycomb shaped rotor,
   the heat-resistant seal is formed of a material whose heatproof temperature is higher than that of the elastic seal,
   the heat-resistant seal includes two or more seal members with opened spacing therebetween to form a labyrinth, and to prevent hot gas from going to the elastic seal, each heat-resistant seal member comprising a plate and an elastic member adjacent to the plate, a gap being maintained between the plate and the surface of the honeycomb shaped rotor, and
   the elastic seal is provided outside the desorption zone with respect to the heat-resistant seal.

2. A revolving gas adsorption concentrator, comprising:
   a honeycomb shape rotor that rotates and supports an adsorbent, the honeycomb shape rotor having a seal that divides the honeycomb shape rotor into at least a desorption zone and an adsorption zone,
   wherein the seal comprises an elastic seal and a heat-resistant seal,
   the elastic seal touches the honeycomb shape rotor,
   the heat-resistant seal is formed of a material whose heatproof temperature is higher than that of the elastic seal,
   the heat-resistant seal includes two or more tabular members, each tabular member having with opened spacing therebetween to form a labyrinth and prevent hot gas from going to the elastic seal, the elastic seal is provided outside the desorption zone with respect to the heat-resistant seal, and the revolving gas adsorption concentrator further comprising a substrate and two heat-resistant plates on opposite sides of the substrate with open spacing between each heat-resistant plate and the substrate to thereby accommodate the heat-resistant seal and the elastic seal on opposite sides of the substrate.

3. The revolving gas adsorption concentrator according to claim 1, wherein the elastic seal comprises a fluororubber.

4. The revolving gas adsorption concentrator according to claim 1, wherein the elastic seal comprises a silicon rubber.

5. The revolving gas adsorption concentrator according to claim 1, wherein the elastic seal is formed of fluororesin reinforced glass fibers.

6. The revolving gas adsorption concentrator according to claim 2, wherein the heat-resistant plate is a metal plate.

7. The revolving gas adsorption concentrator according to claim 2, wherein the heat-resistant plate comprises a metal plate and a fluororesin sheet.

8. The revolving gas adsorption concentrator according to claim 1, wherein a rotational speed of the honeycomb shape rotor is reduced when performing re-generation using hot air relative to the rotational speed of the rotor when performing the adsorption.

9. The revolving gas adsorption concentrator according to claim 1, wherein, for each heat-resistant seal member, the elastic member is a webbed material, the webbed material protruding downward from a lower end of the plate to contact a face of the rotor.

10. The revolving gas adsorption concentrator according to claim 1, wherein each heat-resistant seal member comprises a pair of plates sandwiching the elastic member.

* * * * *